March 31, 1959     J. F. JOHNSON     2,879,641
THERMOELECTRIC SERVOMOTOR
Filed Aug. 23, 1955
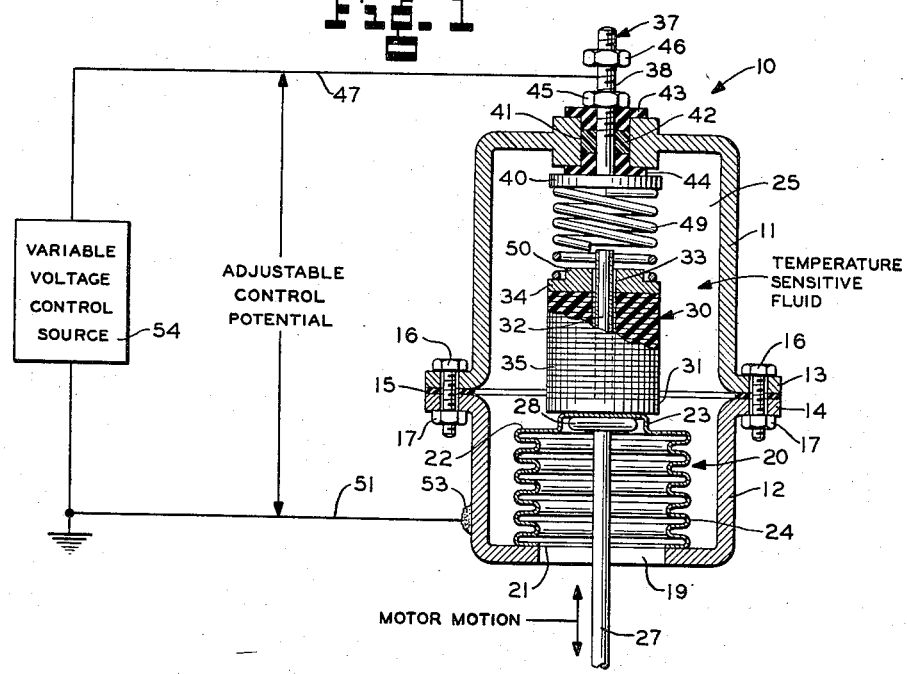
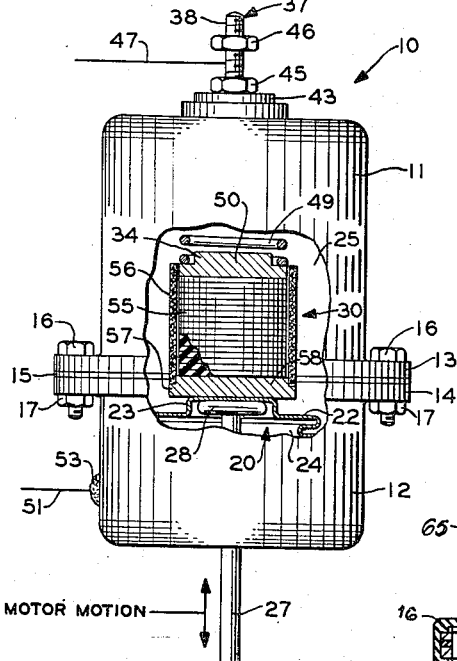
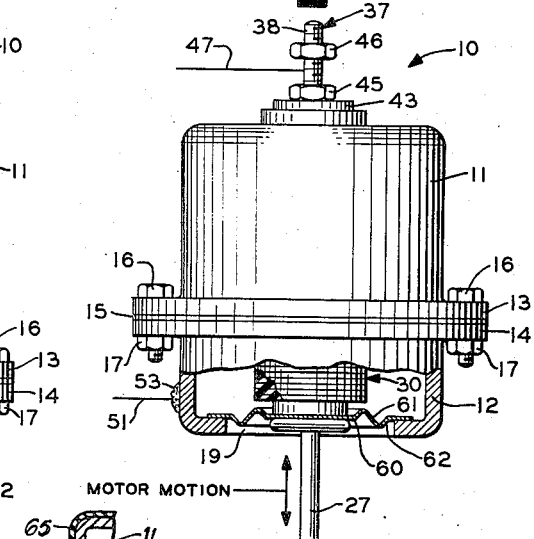
INVENTOR.
JAMES F. JOHNSON
ATTORNEY

United States Patent Office 2,879,641
Patented Mar. 31, 1959

2,879,641
THERMOELECTRIC SERVOMOTOR
James F. Johnson, Montclair, N.J.

Application August 23, 1955, Serial No. 530,067

19 Claims. (Cl. 60—23)

The present invention relates to thermoelectric servomotors for positioning a load by imparting a limited rectilinear movement thereto.

The servomotor of the present invention is of the type in which a limited rectilinear movement is imparted to a load by an output member, the position of the output member being positively determined in accordance with the magnitude of an electrical control potential by voltage-sensitive thermoelectric means including a heat generating electric current regulator disposed in a temperature responsive fluid medium confined within a closed and hermetically sealed chamber. The position of the load driving member is determined by the fluid pressure within the chamber.

An object of the invention is to provide a thermoelectric servomotor which is suitable for use as an actuator for the operation of regulating or proportioning valves or other devices where a positively and accurately controlled rectilinear displacement of a servomotor output member through a limited distance is desirable.

A further object of the invention is the provision of a fluid pressure actuated servomotor in which the changes in fluid pressure are thermally produced by electrical energy, the position of the output member being determined by varying the supply voltage of an energizing circuit for the servomotor.

Still another object of the invention is the provision of a servomotor comprising electrically resistive heat generating means of variable resistance which is self-adjusting in its rate of heat generation in accordance with a desired position for the servomotor output member.

The servomotor of the present invention includes a displaceable control member which forms a part of the electrically resistive heat generator and which is arranged to vary the internal electrical resistance of the heat generator. This control member is connected to the output member in negative feedback relationship so that any extraneous or perturbing force acting on the output member which moves it away from its intended position will produce a corrective displacement of the resistance varying control member. The corrective movement of the control member will be accompanied by an increase or decrease, as the case may be, in the amount of heat produced by the electrically resistive heat generator which, in turn, produces a compensatory change in the fluid pressure within the chamber tending to restore the output member to the predetermined desired position which it would otherwise occupy in the absence of the extraneous disturbing force.

A feature of the invention is the small number and simplicity of its parts, as well as the enclosure of the moving parts of the servomotor in an hermetically sealed, fluid-tight chamber where they are fully and permanently protected against dirt and corrosive atmospheric conditions.

Various other objects, features and advantages of the invention will become apparent upon reading the following specification together with the accompanying drawing forming a part thereof.

Referring to the drawing, Fig. 1 is an elevational view in longitudinal section of a servomotor in accordance with the invention and including an electrical circuit diagram of a control circuit for the servomotor;

Fig. 2 is an elevational view of a modified form of servomotor, partly broken away and shown in longitudinal section to illustrate details of construction;

Fig. 3 is an elevational view of still another modified form of servomotor, partly broken away; and Fig. 4 is a reduced fragmentary view showing thermal insulating material applied to the servomotor housing for purposes of heat economy.

Referring to Fig. 1, the servomotor which is designated generally as 10 comprises upper and lower metallic cup-shaped housing members 11 and 12 with opposed outwardly extending flanges 13 and 14, respectively. A gasket 15 is interposed between the flanges 13 and 14. The housing members 11 and 12 are secured together by a plurality of bolts 16 which pass freely through the flange 13, the gasket 15 and the flange 14. The bolts 16 are shown provided with nuts 17 for tightening the flanges 13 and 14 against gasket 15 to obtain a fluid-tight connection. Preferably a regularly arranged circle of bolts 16 is provided in the usual manner, but only two bolts have been shown in the drawing for simplicity of illustration.

The lower cup-shaped housing member 12 has a circular aperture 19 formed in its bottom wall. An upwardly extending flexible metal bellows 20 is disposed within the lower housing member 12 directly above the aperture 19 and is connected at its lower end at 21 to the inner side of the bottom wall of housing member 12 around the edge of the aperture 19 by soldering to form a fluid-tight connection. The upper end 22 of the bellows 20 is closed and is shown provided with a shallow upwardly directed inverted dish-shaped extension 23. The walls of the bellows 20 comprise lateral annular corrugations 24 so that the bellows 20 expands and contracts vertically in response to pressure changes within a closed hermetically sealed fluid-tight chamber 25 defined by housing members 11, 12 and the bellows 20.

The chamber 25 contains and may be filled with a temperature sensitive pressure fluid medium. This is indicated in Fig. 1 by a corresponding legend. The pressure fluid medium may be a gas, a liquid, a liquid and its vapor or a mixture thereof. The particular fluid medium to be used is selected in accordance with its inherent ability to produce a marked change in pressure in response to a change in the temperature of the pressure fluid. Of course, the pressure fluid must be chemically inert to all materials of the servomotor 10 with which it comes in contact. In practice, a non-toxic fluid commonly used as a refrigerant and commercially known as "Freon" has been found to give satisfactory results.

There is a vertically movable fluid pressure actuated output member 27 which is shown as a rod extending upwardly to the top of the dish-shaped extension 23 of bellows 20 and thence upwardly into the hermetically sealed chamber 25. The lower end of output rod member 27 is adapted for connection to a mechanical load (not shown) to be driven and positioned by servomotor 10. A disc 28 is disposed within the dish-shaped extension 23 of bellows 20 and is fixed to output rod member 27 for movement therewith.

A carbon pile heat generating device of variable resistance designated generally as 30 is disposed within the hermetically sealed chamber 25 in heat transferring relationship with respect to the confined pressure fluid medium. The electrically resistive carbon pile 30 has a bottom electrode 31 bearing on the top of the dish-shaped extension 23 of bellows 20, thus to provide a fluid-tight pressure connection between the bellows 20 and carbon pile 30. This fluid-tight mechanical connection further provides negative feed-back means by connecting the carbon pile 30 both with the bellows 20 and with the output rod member 27. The operation of this negative feedback feature is explained in detail below.

A guide rod 32 is shown extending up through the carbon pile, this rod being surrounded by a sleeve or tube 33 of suitable insulating material such as glass. This insulating sheath for guide rod 32 extends freely up through the top electrode 34 of the carbon pile so as to maintain electrical insulation of the top electrode 34 from the bottom electrode 31 and rod 32. Advantageously, the guide rod 32 may consist of an upward extension of output rod member 27.

The stacked, coaxially centrally apertured carbon discs 35 are individually freely slidably mounted surrounding the insulating sleeve 33 between the top electrode 34 and bottom electrode 31. As is well known in the art, the electrical resistance of the circuit through the pile of carbon discs 35 from top electrode 34 to bottom electrode 31 will vary as a function of compressive mechanical force applied to the discs 35 by the electrodes 34 and 31 and the magnitude of this resistance will decrease as the mechanical pressure increases. Conversely, when the mechanical pressure is reduced, the electrical resistance increases.

At the top of the upper housing member 11 there is an electrical terminal designated generally as 37. The terminal 37 comprises an upright threaded shank portion 38 which protrudes above the upper housing member 11 and an enlarged disc-shaped bottom portion 40 disposed within the chamber 25. There is a central circular aperture 41 formed in the top of upper housing member 11 and this aperture 41 is of larger diameter than the shank portion 38 of terminal 37 which extends vertically therethrough.

A resilient sealing ring 42 formed of synthetic rubber or the like is disposed in aperture 41 and surrounds the shank portion 38 of terminal 37. The sealing ring 42 is compressed between upper and lower shouldered washers 43 and 44 to provide a fluid-tight seal protecting the chamber 25 against leakage. The washers 43 and 44 are formed of relatively hard electrical insulating material such as fiber and pressure on sealing ring 42 is maintained by a nut 45 threaded on shank 38 just above the upper washer 43. The disc-shaped bottom portion 40 of terminal 37 is drawn upwardly against lower washer 44 by nut 45. The shouldered construction causes upper and lower washers 43 and 44 to enter partially within the aperture 41 and maintain shank 38 centered therein. A further nut 46 threaded on shank 38 above nut 45 is provided for fastening an electrical conductor 47 to terminal 37.

A helical metallic compression spring 49 extends between the lower surface of the disc-shaped bottom portion 40 of terminal 37 and the upper surface of the top carbon pile electrode 34. The lower end of compression spring 49 is retained against lateral movement by engagement with an annular peripheral shoulder 50 formed on the upper side of the top carbon pile electrode 34. At its upper end the spring 49 bears upwardly against the enlarged disc-shaped bottom portion 40 of terminal 37, being suitably secured against lateral movement by soldering. A ground conductor 51 is connected by solder 53 to the exterior of lower housing member 12 and extends to an adjustable source of control potential 54 along with the conductor 47 which is connected to terminal 37.

An energizing circuit for the carbon pile 30 is traceable from control potential source 54 over conductor 47 to terminal 37. From the enlarged bottom portion 40 of terminal 37 the circuit continues through the helical compression spring 49 to the top electrode 34 of carbon pile 30 and thence through the carbon discs 35 to the bottom electrode 31 which is connected to the flexible metallic bellows 20. The bellows 20 is connected to the metallic lower housing member 12 and through ground conductor 51 back to the adjustable source 54 of control potential.

The carbon pile 30 has been illustratively disclosed as an example of a heat generating electrical circuit control element which is disposed in the hermetically sealed chamber 25 and which has an electrical resistance which is variable in accordance with displacement of a movable control member exemplified by the lower electrode 31 in response to a mechanical force applied thereto. This is a preferred form of circuit control element which has been found to give satisfactory results in practice. It is to be understood, however, that other forms of heat generating electrical devices which include displaceable resistance varying control elements may be used.

Source 54 may deliver direct current or alternating current of any frequency desired. Preferably the source 54 together with conductors 47 and 51 provide an energizing circuit of low internal resistance or impedance, as the case may be, so that the current flow therethrough is determined principally by the electrical resistance of the carbon pile 30.

In operation, a control potential of predetermined magnitude is supplied to the servomotor 10 from the source 54 over conductors 47 and 51. The servomotor 10 is assumed initially to be at or near room temperature so that the fluid pressure in chamber 25 is at a minimum. The resiliency of the metal bellows 20 in combination with any upward forces which may result from connection of the servomotor to a mechanical load urges the bottom electrode 31 upwardly so that the pressure applied to the discs 35 of carbon pile 30 is at a maximum when the fluid pressure in chamber 25 is at a minimum.

Starting at the minimum temperature or room temperature, when a certain predetermined control potential from source 54 is initially applied to the energizing circuit for the carbon pile 30, the carbon pile 30 is under maximum mechanical pressure and its electrical resistance is at a minimum. Accordingly, the carbon pile 30 initially draws a maximum amount of power from the energizing circuit and dissipates this electrical energy as heat generated within the chamber 25. The heat raises the temperature of the fluid medium which surrounds the carbon pile 30 and thereby causes the fluid pressure in chamber 25 to increase and press the top 22 of bellows 20 downwardly, thereby producing a downward displacement thereof. Because the bottom electrode 31 of carbon pile 30 is rigidly connected to the top 22 of the bellows 20, this downward movement of the top 22 of bellows 20 displaces the bottom electrode 31 downwardly along with the discs 35 and top electrode 34, the latter of which slide over the insulating sleeve 33. The helical compression spring 49 which presses on top electrode 34 thus becomes elongated and the downwardly directed mechanical force exerted by spring 49 on top electrode 34 is correspondingly reduced with a resultant decrease in the mechanical force of compression applied to the discs 35 and an accompanying increase in their overall effective electrical resistance. The increased electrical resistance of discs 35 decreases the current drawn by the carbon pile 30 from the energizing circuit and this, in turn, decreases the power consumption and the resultant heat generated and imparted to the surrounding fluid medium by the discs 35.

No means are provided to exclude the pressure fluid from the interior of the carbon pile 30. As a result, due to the inherent porosity of the carbon discs, the fluid pressure within the stacked discs of the carbon pile 30 is self-equalizing with respect to the external pressure of the fluid pressure medium surrounding the carbon pile 30 so that the pile 30 remains unaffected by pressure changes in the pressure fluid except, of course, insofar as such pressure changes produce mechanical displacements of the bellows 20. These mechanical displacements, in turn, vary the mechanical compressive force applied to the discs 35 of the carbon pile 30 by the end electrodes 31 and 34 without any interference caused by the effects of variations in the pressure of the pressure fluid acting directly on the carbon pile 30 and on its end electrodes 31 and 34.

As the downward displacement of output rod member 27 progresses, the heat imparted to the fluid medium decreases and its temperature drops through heat losses so that a point of equilibrium is reached at which the heat generated by the carbon pile 30 is just sufficient to maintain the fluid temperature and resulting pressure in chamber 25 at a stabilized value which holds the bellows 20 compressed to a desired extent which, in turn, determines the desired vertical position of output rod member 27. If the voltage output of source 54 is reduced, this equilibrium will be attained with a lower fluid temperature and pressure and a correspondingly reduced downward displacement of control rod member 27. Similarly, if the voltage output of adjustable source 54 is increased, a greater downward displacement of output rod member 27 will be required before equilibrium is attained.

It is a significant feature of the operation of the present invention that the principle of negative feedback stabilization is utilized between the position assumed by the output rod member 27 and the control voltage supplied by source 54. By way of illustration, let us assume that the servomotor is in operation and that the output rod member 27 has assumed a desired position in accordance with a corresponding input voltage from the source 54. Let us assume, moreover, that any unusual and extraneous perturbing force of any type is applied vertically through rod 27 to the servomotor from the load.

If this perturbing force is directed upwardly, then the carbon pile 30 will be compressed, its electrical resistance will accordingly be lowered, its electrical heat dissipation will be increased in accordance with the formula $$W = \frac{E^2}{R}$$

the fluid in the chamber 25 will be heated to a correspondingly increased temperature and will press downwardly on the bellows 20 with an increased mechanical thrust in a direction to counteract the perturbing upward force and to restore the member 27 to its original and desired position.

If, on the other hand, the perturbing force from the load should be directed downwardly, then the carbon pile will be relieved of pressure, its electrical resistance will increase, the heat dissipation will decrease in accordance with the above formula, the temperature of the fluid in the chamber will drop and its mechanical pressure exerted downwardly on the top of the bellows will decrease, thereby tending to restore the output rod member toward its original upwardly located desired position.

This self-stabilizing feature of the invention tends to minimize any effects of varying mechanical loads upon the position of the motor output rod 27 and makes this invention particularly useful in the field of fluid control valves where pressure fluctuations of the controlled fluid and water hammer effects may be encountered.

Referring to Fig. 2, there is shown a modified form of carbon pile 30 in which the carbon discs 55 are solid instead of being centrally apertured as shown in Fig. 1, the guide rod 32 and insluting sleeve 33 being omitted. The discs 55 are guided and maintained in stacked relationship by an external cylindrical sleeve 56 which loosely surrounds the peripheries of the discs 55 of the carbon pile 30. The bottom electrode 57 is formed with an annular peripheral shoulder 58 which supports the lower end of the external sleeve 56. Advantageously, the sleeve 56 is of foraminous construction, being formed of porous ceramic material or the like which gives free access to the discs 55 by the surrounding fluid medium and which will additionally insulate non-adjacent ones of the discs 55 electrically from each other.

Fig. 3 shows a further modified form of the invention wherein the metallic bellows 20 of Fig. 1 has been replaced by a flexible resilient metallic diaphragm 60 provided with concentric annular corrugations 61, 62 for increasing its flexibility. The periphery of diaphragm 60 is connected to the bottom inner surface of lower housing member 12 adjacent to the edge of the central aperture 19 in lower housing member 12 by soldering to effect a fluid-tight connection.

If desired, the metallic housing comprising housing members 11 and 12 may be thermally insulated as by suitable thermal insulating material 65 shown in Fig. 4. Alternatively, the housing 11, 12 may be heat conditioned or otherwise treated or controlled to render the device more efficient by economy of operating power. It should be appreciated, however, that a sufficiently high coefficient of thermal conductivity must be provided to permit cooling of the temperature sensitive fluid at a rate giving adequately rapid response to decreases in electrical heating energy supplied to the carbon pile 30.

Because of its simplicity of structure and few parts the servomotor of the invention can be made up in very inexpensive forms. It occupies but a small space and can be used in places where only a limited space is available, and of possible greatest importance, the load positioning action is simple, direct, accurate and reliable.

While presently preferred illustrative forms of the invention are disclosed, it will be apparent that further modifications and changes may be made coming within the scope of the appended claims.

Also, it will be appreciated that terms employed herein have been used in a descriptive rather than in a limiting sense, except as the intent at limitation plainly appears.

What is claimed is:

1. An enclosure statically affixed in space, a mobile member capable of limited motion with respect to said enclosure, an electrically resistive member within said enclosure having resistance variable in response to mechanical motion, a source of electrical power in circuit with said resistive member, a thermally expansive fluid within said enclosure and in thermal contact with said resistive member, a movable diaphragm forming a portion of said enclosure and affixed to said mobile member, and a mechanical linkage between said mobile member and said resistive member, said mechanical linkage having an orientation to increase electrical dissipation in said resistive member in synchronism with motion of said member in a direction to compress said fluid.

2. A thermoelectric servomotor, comprising means defining a hermetically sealed chamber, a temperature sensitive fluid medium disposed within said chamber, means responsive to fluid pressure communicating with the interior of said chamber, an output member connected to said fluid pressure responsive means for displacement thereby, a heat generating variable resistance device, said resistance device including means for varying its resistance in response to variations in a mechanical compressive force applied to said resistance varying means, said resistance device being disposed within said chamber in thermal contact with said fluid medium, an energizing electrical potential source external to said chamber and electrically in circuit with said resistance device, and a resilient linkage within said chamber mechanically connecting said pressure responsive means with said resistance varying means and maintaining a compressive mechanical force on said resistance varying means, said compressive force changing to produce an increase in said resistance when said output member is displaced in the direction of movement produced by an increase in the pressure of said fluid medium.

3. A servomotor according to claim 2, wherein said means defining said sealed chamber comprises material having a low coefficient of thermal conductivity.

4. A servomotor according to claim 2, in which said means responsive to fluid pressure comprises a flexible metal bellows.

5. A servomotor according to claim 2, in which said potential source is of adjustable voltage for controlling the position of said output member.

6. A thermoelectric servomotor, comprising means defining a hermetically sealed chamber, a temperature sensitive fluid medium confined within said chamber, fluid pressure responsive means communicating with the interior of said chamber, an output member connected with said pressure responsive means for displacement thereby, an elongated electrically resistive member disposed in said chamber in thermal contact with said fluid medium, said resistive member decreasing its electrical resistance in response to an increase in a longitudinally directed mechanical compressive force applied to its opposite ends, an energizing circuit including a potential source external to said chamber, said energizing circuit being connected to said resistive member for heating said fluid medium, resilient means having one portion fixed and another portion acting on one end of said resistive member to apply a compressive force thereto, and a mechanical connection between the other end of said resistive member and said pressure responsive means, said mechanical connection causing a displacement of said resistive member to decrease said compressive force accompanying an increase in the pressure of said fluid medium.

7. A servomotor according to claim 6, wherein said electrically resistive member comprises a series of carbon discs disposed in stacked relationship, and in which said resilient means comprises a helical compression spring one end portion of which is fixed, the other end portion acting on said carbon pile to apply said compressive force thereto.

8. A servomotor of the class described, comprising: means defining an hermetically sealed chamber; a temperature sensitive fluid medium confined within said chamber; fluid pressure actuated means communicating with the interior of said chamber and movable in response to variations in the pressure of said fluid medium; a movable output member connected to said fluid pressure actuated means for displacement thereby in accordance with the pressure of said fluid medium; a carbon pile member having an electrical resistance which varies in accordance with the magnitude of a mechanical force applied thereto, said carbon pile member being disposed within said chamber in heat transferring relationship with respect to said fluid medium, said carbon pile member being mechanically connected to said pressure actuated means to vary the electrical resistance thereof in accordance with a resultant force produced by the pressure of said fluid medium and any force transmitted thereto by said output member through said connections to said pressure actuated means; resilient means acting on said carbon pile member for causing the resistance thereof to vary gradually throughout a range of movement of said pressure actuated means and said output member; and an energizing circuit for said carbon pile member for heating said carbon pile member to raise the temperature of said fluid medium and thereby increase the fluid pressure exerted on said pressure actuated means.

9. A servomotor according to claim 8, in which said carbon pile member is connected to said pressure actuated means to increase the electrical resistance thereof in response to an increase in the pressure of said fluid medium.

10. A servomotor according to claim 8, in which said carbon pile member is elongated and longitudinally compressible to decrease the resistance thereof, said fluid pressure actuated means being connected to one end portion of said carbon pile member, and wherein said resilient means comprises spring means having a relatively stationary portion and a relatively movable portion connected to an opposite end portion of said carbon pile member for yieldingly exerting a force thereon which varies in accordance with movements of said fluid pressure actuated means.

11. A servomotor according to claim 10, wherein said spring means consists of a helical compression spring.

12. A thermoelectric servomotor, comprising a housing; a longitudinally compressible and expansible bellows communicating with the interior of said housing, said housing and said bellows together defining a closed hermetically sealed chamber; a temperature sensitive fluid pressure medium confined within said chamber, variations in the pressure of said medium causing variations in the length of said bellows; electrical heating means of variable electrical resistance disposed in said chamber for varying the temperature of said medium, said heating means comprising means mechanically connected to said bellows for displacement in accordance with said variations in the length of said bellows to vary the electrical resistance of said heating means throughout a range of variations in said bellows length; an energizing circuit connected to said heating means for heating said medium; and an output member connected to said bellows for displacement thereby along with said means comprised in said heating means for varying its electrical resistance, said resistance varying means being connected to said bellows in negative feedback relationship, whereby the position assumed by said output member for a predetermined voltage applied to said energizing circuit is stabilized against the effects of perturbing forces acting on said output member.

13. A thermoelectric servomotor, comprising a housing having an aperture formed therein; a flexible diaphragm closing said aperture, said housing and said diaphragm together defining a closed hermetically sealed chamber; a temperature sensitive fluid pressure medium confined within said chamber, variations in the pressure of said medium causing displacements of said diaphragm; electrical heating means of variable resistance disposed in said chamber for varying the temperature of said medium, said heating means comprising means mechanically connected to said diaphragm for displacement therewith to vary the electrical resistance of said heating means throughout a range of displacements of said diaphragm; an energizing circuit connected to said heating means for heating said medium; and an output member connected to said diaphragm for displacement thereby along with said means comprised in said heating means, said resistance varying means being connected to said diaphragm in negative feedback relationship, whereby the position assumed by said output member for a predetermined voltage applied to said energizing circuit is stabilized against the effects of perturbing forces acting on said output member.

14. A thermoelectric servomotor, comprising: means defining an hermetically sealed chamber; a temperature sensitive fluid disposed within said chamber, the pressure within said chamber exerted by said fluid increasing with an increase in the temperature thereof and decreasing with a decrease in said temperature; electrically resistive heating means disposed within said chamber in heat transferring relationship with respect to said fluid for increasing the temperature of said fluid in response to any increase in the electrical energy input to said heating means, the temperature of said fluid decreasing by heat loss in response to any decrease in said energy input to said heating means, said heating means including a displaceable control member which varies the electrical resistance thereof; an output member movable in mutually opposite directions and adapted to be connected to a mechanical load to be positioned by said servomotor; fluid pressure actuated means communicating with said chamber and connected to said output member to vary the position thereof in accordance with pressure variations of said fluid within said chamber; an energizing circuit for said heating means; a source of electrical energy of adjustably constant potential connected to said energizing circuit; means mechanically connecting said output member to said control member in negative feedback relationship to increase the electrical resistance of said heating means in response to any displacement of said output member in the direction which accompanies an increase in pressure in said chamber and to decrease said electrical resistance in response to displacement of said output member in the opposite direction, whereby, with a constant potential of predetermined value applied to said energizing circuit, any displacement of said output member produced by an extraneous force other than a change in fluid pressure within said chamber will produce a compensatory variation in the resistance of said heating means accompanied by a corresponding variation in the pressure within said chamber tending to restore said output member to the position which it would otherwise occupy in the absence of said extraneous force.

15. A servomotor according to claim 14, in which said chamber defining means has an aperture formed therein and wherein said fluid pressure actuated means includes a flexible member permanently closing said aperture, said output member comprising an elongated longitudinally movable rod connected to said flexible member and extending into said chamber, and in which said heating means comprises a plurality of stacked coaxially apertured carbon discs in direct thermally conductive contact with said fluid, an electrode fixedly mounted on said rod and disposed within said chamber, said electrode constituting said control member, an end one of said discs being in engagement with said electrode, all of said discs being slidably mounted on said rod and electrically insulated therefrom, said heating means further comprising an electrode in yielding engagement with an end one of said discs opposite said first-named end disc, said energizing circuit being connected to said electrodes.

16. A thermoelectric servomotor comprising means defining a closed hermetically sealed chamber, a temperature sensitive fluid medium disposed in said chamber, fluid pressure responsive means communicating with the interior of said chamber for mechanical displacement in response to variations in the pressure of said fluid medium, electrically resistive heat generating means disposed in said chamber in direct thermally conductive contact with said fluid medium for raising the temperature thereof, said heat generating means including a displaceable control member for varying the electrical resistance thereof, an output member connected to said pressure responsive means for displacement thereby, an energizing circuit connected to said heat generating means for varying the temperature of said fluid medium, and a mechanical negative feedback connection between said output member and said control member, said mechanical connection causing an increase in the electrical resistance of said heat generating means in response to a displacement of said output member in the direction in which said output member is displaced by said pressure responsive means accompanying an increase in the pressure of said fluid medium.

17. A thermoelectric servomotor, comprising in combination means defining a hermetically sealed chamber, a temperature sensitive fluid confined within said chamber, the pressure of said fluid increasing with an increase in the temperature thereof, fluid pressure responsive means communicating with the interior of said chamber for mechanical displacement in response to variations in the pressure of said fluid, a pile of carbon discs enclosed within said chamber in thermally conductive contact with said fluid, one end of said pile being connected to said pressure responsive means for displacement thereby, an output member connected to said fluid pressure responsive means for displacement thereby along with said one end of said pile, an electrical energizing circuit connected to said discs to cause heat generation thereby for raising the temperature of said fluid, means yieldingly exerting a pressure on the other end of said pile for reducing the electrical resistance thereof, said pressure responsive means decreasing the pressure on said pile in response to an increase in the pressure of said fluid, and a source of electrical energy of adjustable potential connected to said energizing circuit for varying the heat generated by said discs, whereby the position of said output member may be varied by varying said adjustable potential.

18. A thermoelectric servomotor, comprising means defining a pressure-tight chamber, a temperature sensitive fluid confined within said chamber, the pressure of said fluid increasing in response to the heating thereof, mechanically movable fluid pressure responsive means connected to the interior of said chamber for controlled displacement in response to changes in the pressure of said fluid, an output member connected to said pressure responsive means for displacement therewith, two separately movable electrodes disposed in said chamber, a plurality of individually movable carbon discs disposed in said chamber and arranged in stacked relationship, said discs being in mechanical engagement and in electrical contact with one another, said electrodes being in engagement with the end ones of said discs, resilient means acting on one of said electrodes for compressing said stacked discs to decrease the electrical resistance between said electrodes, the other of said electrodes being connected to said pressure responsive means for displacement thereby along with said output member, movement of said other electrode causing a reduction in the pressure on said discs and an increase in the electrical resistance between said electrodes in response to a displacement of said output member accompanying an increase in the pressure of said fluid, a low impedance energizing circuit connected to said electrodes for heating said fluid and a low impedance source of electrical energy of adjustable potential, said source being connected to said energizing circuit for adjustment of the position of said output member continuously throughout a range of positions of displacement, said adjustment being determined by the magnitude of said adjustable potential, whereby displacement of said output member by an extraneous perturbing force will vary the compression of said discs to vary the heating of said fluid in a compensatory manner for restoring said output member to a predetermined position determined by said magnitude of said adjustable potential.

19. A thermoelectric servomotor, comprising means defining a hermetically sealed chamber, a movable output member comprising a portion disposed exteriorly of said chamber and adapted for connection to a mechanical load, electrically resistive heat generating means disposed in said chamber and having an electrical resistance which is variable in accordance with a mechanical force applied thereto, said heat generating means comprising a plurality of individually movable carbon discs disposed in stacked relationship in mechanical engagement and in electrical contact with one another, two electrodes in contact with the end ones of said discs and a foraminous sleeve member formed of electrically insulative material loosely surrounding said discs and extending between said electrodes for guiding and maintaining said discs in said stacked relationship, resilient means yieldingly pressing on one of said electrodes, a temperature sensitive fluid medium confined in said chamber and adapted to be heated by said generating means for changing the pressure thereof, fluid pressure actuated means communicating with said chamber and connected to cause movement of said output member, an energizing circuit for said heat generating means, said electrodes being connected in said energizing circuit and means interconnecting said output member and the other of said electrodes for causing a change in the resistance of said generating means in response to a displacement of said output member produced by a change in the fluid pressure in said chamber.

References Cited in the file of this patent

UNITED STATES PATENTS 1,881,964     Persons ---------------- Oct. 11, 1932